(12) United States Patent
Rush et al.

(10) Patent No.: US 11,579,514 B2
(45) Date of Patent: Feb. 14, 2023

(54) COMPUTATIONAL OPTICS

(71) Applicant: Advanced Micro Devices, Inc., Santa Clara, CA (US)

(72) Inventors: Allen H. Rush, Santa Clara, CA (US); Hui Zhou, Shanghai (CN)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/133,151

(22) Filed: Dec. 23, 2020

(65) Prior Publication Data

US 2021/0149276 A1 May 20, 2021

Related U.S. Application Data

(63) Continuation of application No. 15/790,825, filed on Oct. 23, 2017, now Pat. No. 10,884,319.

(30) Foreign Application Priority Data

Sep. 28, 2017 (CN) .......................... 201710898984.3

(51) Int. Cl.
| | |
|---|---|
| *G03B 15/07* | (2021.01) |
| *G03B 9/08* | (2021.01) |
| *G06T 7/30* | (2017.01) |
| *G03B 9/02* | (2021.01) |
| *H04N 9/04* | (2006.01) |

(Continued)

(52) U.S. Cl.
CPC ............... *G03B 15/07* (2013.01); *G03B 9/02* (2013.01); *G03B 9/08* (2013.01); *G06T 7/30* (2017.01); *H04N 5/2351* (2013.01); *H04N 5/2353* (2013.01); *H04N 5/3572* (2013.01); *H04N 9/045* (2013.01); *G06T 2207/20132* (2013.01)

(58) Field of Classification Search
CPC .. H04N 5/2351; H04N 5/2353; H04N 5/3572; H04N 9/045; G06T 7/30; G06T 2207/20132; G03B 9/02; G03B 9/08; G03B 15/07; G03B 2217/002
See application file for complete search history.

(56) References Cited

U.S. PATENT DOCUMENTS 10,049,491 B1 * 8/2018 Engel ...................... G06T 15/60
2002/0085219 A1 7/2002 Ramamoorthy
(Continued)

FOREIGN PATENT DOCUMENTS

| CN | 101419063 A | 4/2009 |
|---|---|---|
| CN | 102162851 A | 8/2011 |

(Continued)

*Primary Examiner* — Daniel G Mariam
(74) *Attorney, Agent, or Firm* — Volpe Koenig (57) ABSTRACT

A system and method for controlling characteristics of collected image data are disclosed. The system and method include performing pre-processing of an image using GPUs, configuring an optic based on the pre-processing, the configuring being designed to account for features of the pre-processed image, acquiring an image using the configured optic, processing the acquired image using GPUs, and determining if the processed acquired image accounts for feature of the pre-processed image, and the determination is affirmative, outputting the image, wherein if the determination is negative repeating the configuring of the optic and re-acquiring the image.

20 Claims, 9 Drawing Sheets

(51) Int. Cl.
  *H04N 5/357* (2011.01)
  *H04N 5/235* (2006.01)

(56) References Cited

U.S. PATENT DOCUMENTS

| | | |
|---|---|---|
| 2004/0104387 A1 | 6/2004 | Mogamiya |
| 2008/0151095 A1 | 6/2008 | Chou |
| 2009/0174786 A1 | 7/2009 | Joseph |
| 2014/0079319 A1 | 3/2014 | Lin |
| 2014/0192224 A1 | 7/2014 | Laroia |
| 2016/0065938 A1 | 3/2016 | Kazemzadeh |
| 2019/0031370 A1 | 1/2019 | Cao |

FOREIGN PATENT DOCUMENTS

| | | |
|---|---|---|
| CN | 102778820 A | 11/2012 |
| CN | 103679759 A | 3/2014 |
| CN | 105242488 A | 1/2016 |

\* cited by examiner

COMPUTATIONAL OPTICS

CROSS REFERENCE TO RELATED APPLICATION

This application is a continuation of U.S. application Ser. No. 15/790,825, filed Oct. 23, 2017, which claims priority to Chinese Patent Application No. 201710898984.3, filed Sep. 28, 2017, the entire contents of which is hereby incorporated by reference as if fully set forth herein.

BACKGROUND

In computer processing of images, attempts have be made to manage and control light bundles in order to improve the processing of the received light. In order to control and manage the light bundles, attempts have been made to put grid-type processing at the sensor location via focal plane processing. Such solutions prove difficult to program and provide limited functionality. Other solutions use adaptive optics to remove global artifacts including atmospheric interference. However, a need exists to provide high performance processing of pixel level data and associated optics functions at or effectively at the place of image capture.

BRIEF DESCRIPTION OF THE DRAWINGS

A more detailed understanding can be had from the following description, given by way of example in conjunction with the accompanying drawings wherein.

DETAILED DESCRIPTION

GPU-type processing power is integrated at the optics level to pre-process light bundles prior to capturing an image using a sensor. In particular, a processing element (compute unit (CU), SIMD) is assigned each light bundle to provide management and control of the light bundle and associated mechanisms in each light bundle optical path. This assignment occurs as processing resources are available, or alternatively is preset by matching mechanism and CU.

A system and method for controlling characteristics of collected image data are disclosed. The system and method include performing pre-processing of an image using GPUs, configuring an optic based on the pre-processing, the configuring being designed to account for features of the pre-processed image, acquiring an image using the configured optic, processing the acquired image using GPUs, and determining if the processed acquired image accounts for the feature of the pre-processed image, and if the determination is affirmative, outputting the image, wherein if the determination is negative, the configuring of the optic is repeated and the image re-acquired.

Figure 1:
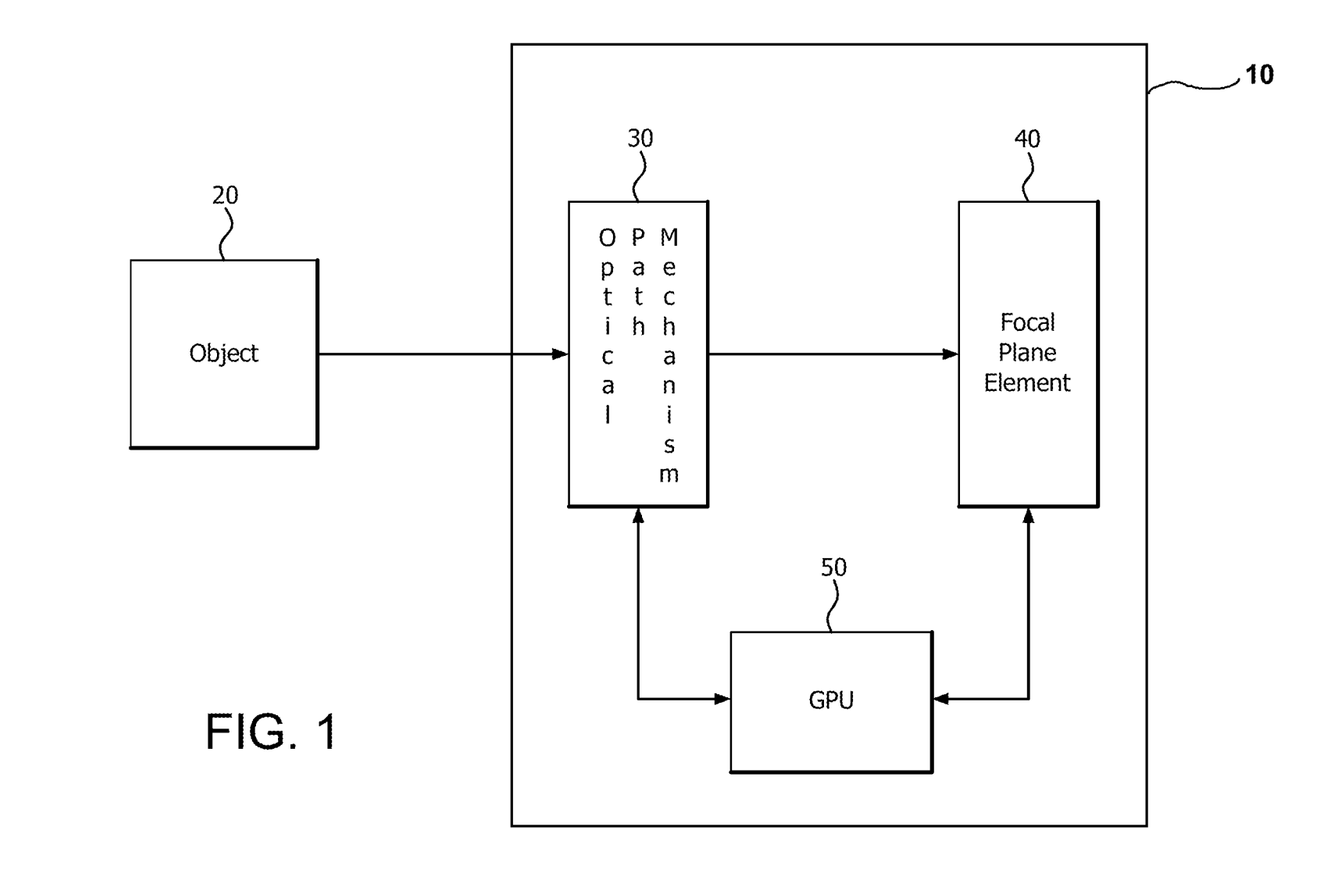
FIG. 1 illustrates a system block diagram illustrating an example system in which one or more features of the disclosure can be implemented.

FIG. 1 illustrates a system block diagram illustrating an example system 10 in which one or more features of the disclosure can be implemented. System 10 is used for imaging at least one object 20 and includes at least one optical path mechanism 30, one or more focal plane elements 40 and a plurality of GPUs 50. For sake of clarity, the present system 10 is depicted imaging a single object 20 using a single optical path mechanism 30, a single focal plane element 40 and a GPU 50, although it would be understood that any number of any one of object 20, optical path mechanism 30, focal plane element 40 and GPU 50 can be utilized.

At least one object 20 is any object which is viewed by an optical system, such as system 10. Object 20 may include a scene or source that is being photographed, such as an apple, a mountain range, stem, or even a group of friends being photographed. Object 20 reflects therefrom numerous light rays that will be described herein below.

At least one optical path mechanism 30 includes any interaction with a ray bundle that is included in a system, such as system 10. This at least one optical path mechanism 30 includes, without limitation, an optical element, reverse digital micromirror devices (DMD) elements, nanoelectromechanical systems (NEMS) structures, microelectromechanical systems (MEMS) structures, carbon nanotubes and other devices which manipulate light as controlled by the plurality of GPUs 50. Additional detail on the optical path mechanism 30 is included below.

One or more focal plane elements 40 include any number of focal plane arrays or sensors, including detectors in image systems and other focal elements. Additional detail on the focal plane elements 40 is included below.

Plurality of GPUs 50 includes any processing device and/or compute resources for processing pixel level data and/or controlling focal plane elements and/or optical path mechanisms. Plurality of GPUs 50 is used to integrate processing power at the optical path mechanism to pre-process light bundles prior to focal plane element 40 capture. For example, each processing element (as will be described below) of the plurality of GPUs 40 may be assigned to control a specific light bundle found within the light field (as will be described below).

Alternatively, plurality of GPUs 50 is used to integrate with an array of focal plane elements 40 typically present in an image sensor, to enable each focal plane element 40 to be treated as a local element to a processing element, referred to herein as a compute units, in the plurality of GPUs 50 to be scheduled and managed accordingly. Additional detail on the plurality of GPUs 50 is included below.

Figure 2:
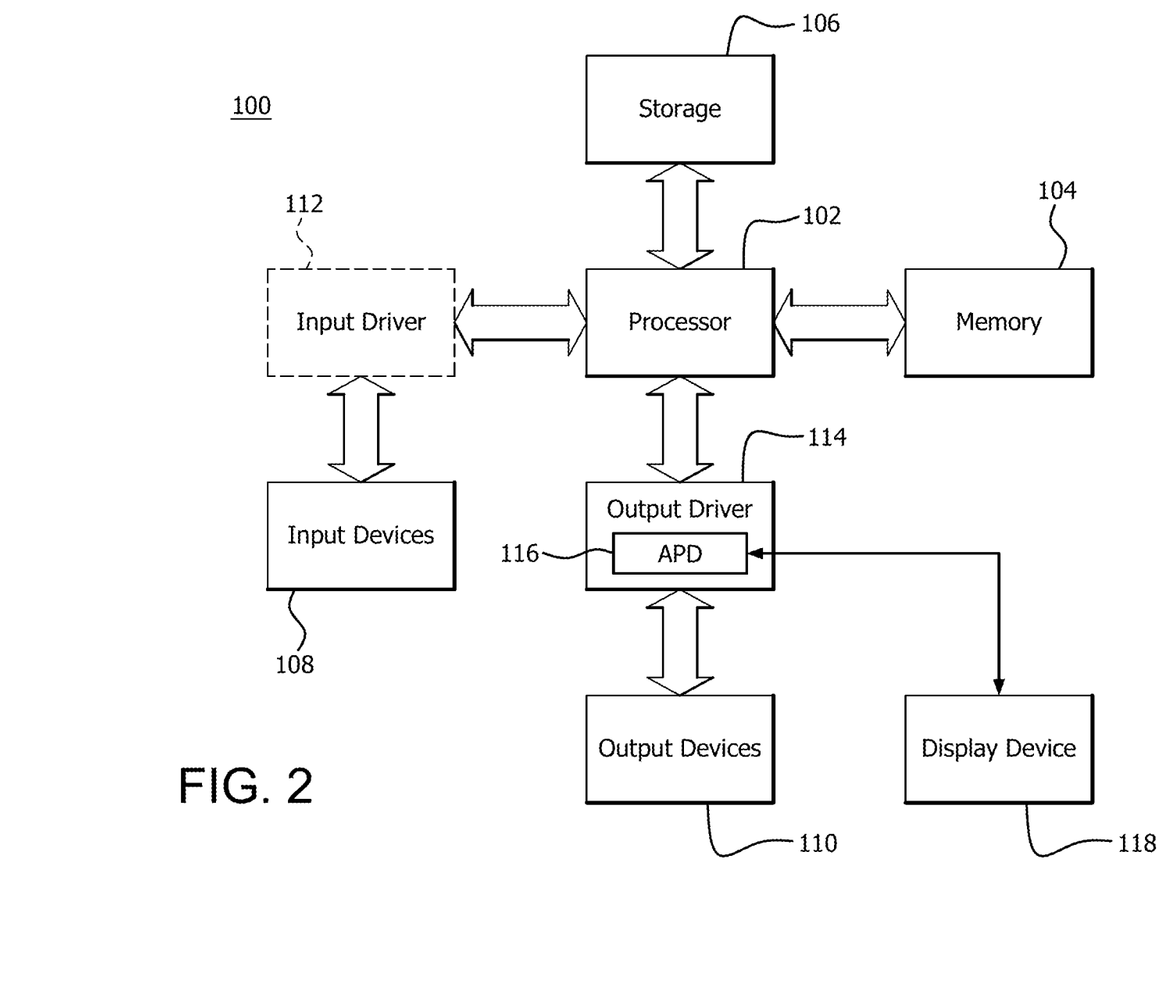
FIG. 2 is a block diagram of an example device in which one or more features of the disclosure can be implemented.

FIG. 2 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 2.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device (APD) 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data (SIMD) paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 3:
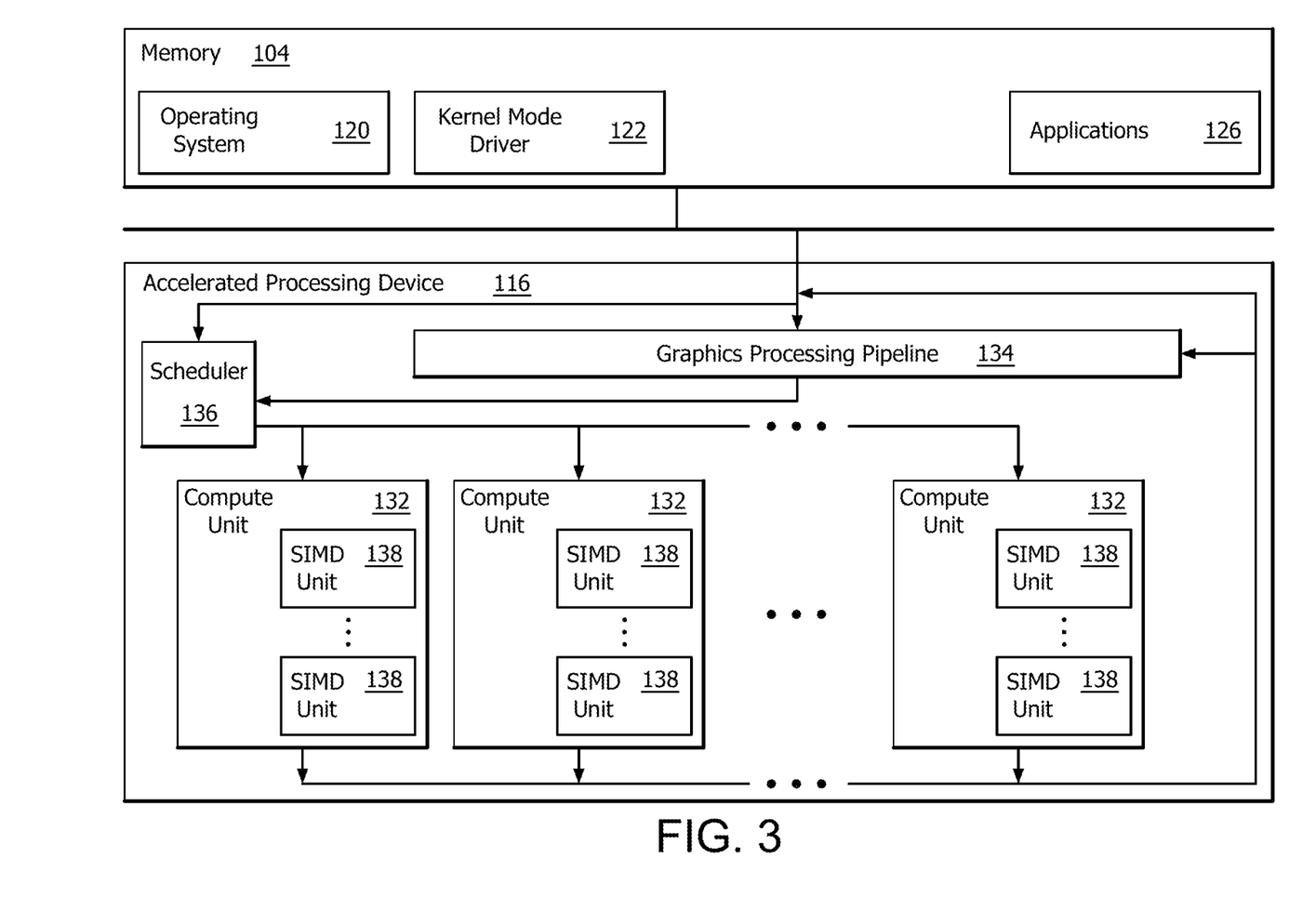
FIG. 3 is a block diagram of the device of FIG. 2 illustrating additional detail.

FIG. 3 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus, in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 4:
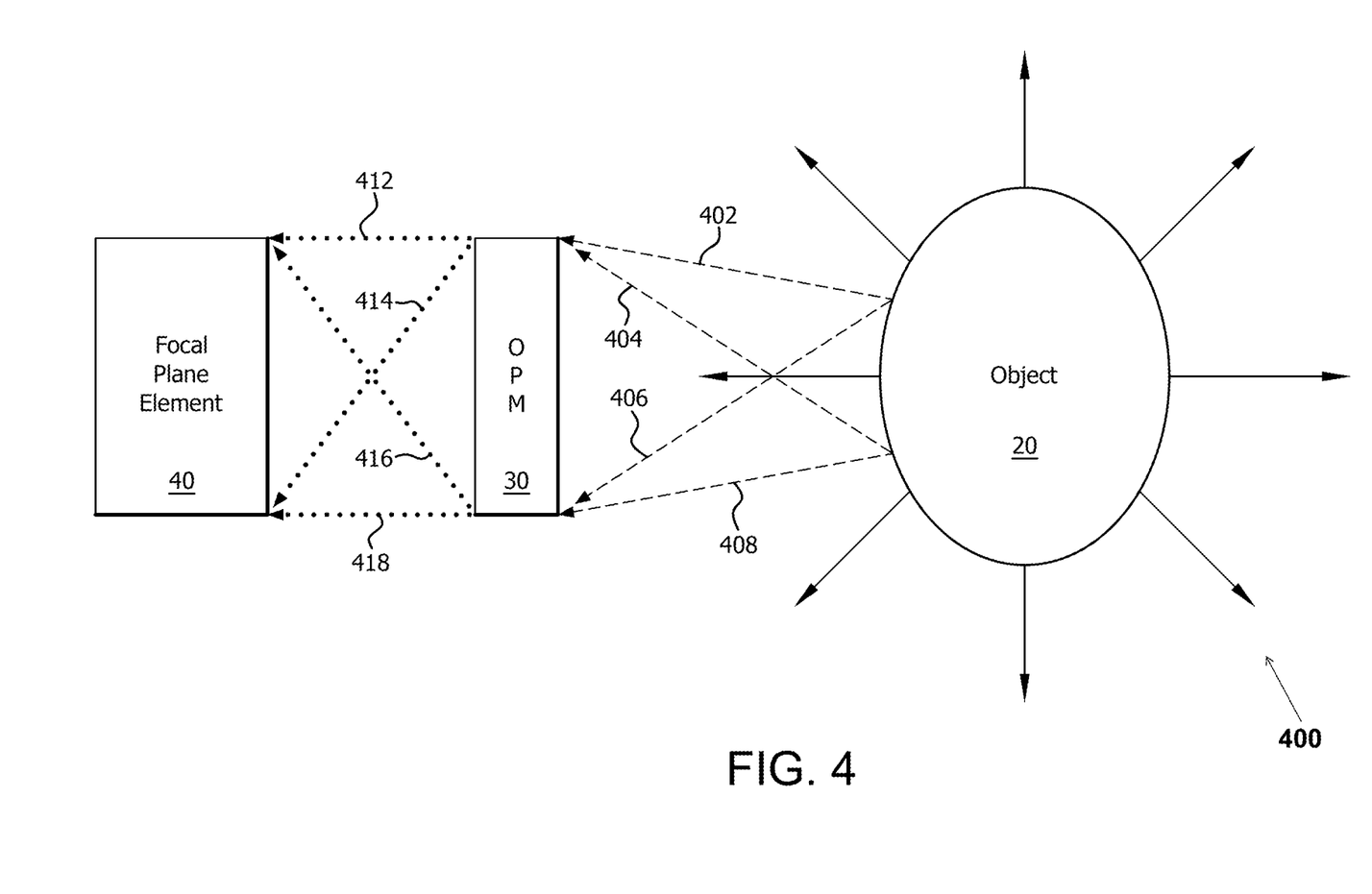
FIG. 4 illustrates a diagram of a light field emanating from the object of FIG. 1.

FIG. 4 illustrates a diagram of a light field emanating from object 20 of FIG. 1. Object 20 is illuminated from numerous light sources (not shown), including but not limited to, the sun, man-made light sources, and other light rays striking object 20. The illumination of object 20 is reflected by object 20 in all directions. All of the rays reflected by object 20 (examples of which are indicated as solid or dashed arrows) represent the light field 400 emanating from object 20.

Certain rays 402, 404, 406, 408 (shown as dashed arrows) of the light field 400 are incident on optical path mechanism 30. Rays 402, 404, 406, 408 include information such as color of the object 20, intensity and direction. This information provides the information necessary to perceive the object 20. Optical path mechanism (OPM) 30 provides a stereoscopic view of object 20 based on the dimensions of optical path mechanism 30 and capturing light from multiple vantage points. That is, the angular directions of the light rays are captured. This stereoscopic view allows perception of how far away object 20 is.

Optical path mechanism 30 relays the rays 402, 404, 406, 408 to the focal plane element 40 as rays 412, 414, 416, 418. The color, intensity and direction contained within rays 402, 404, 406, 408 are conveyed by optical path mechanism 30 to focal plane element 40 via rays 412, 414, 416, 418.

By controlling the optical path mechanism 30 different viewpoints of object 20 are provided. As will be shown in the specific examples below, the different viewpoints of object 20 are provided for using the optical path mechanism 30 in a number of different ways.

For a given light capturing device, GPU 50 assigns a processing element to at least one light bundle in the light field 400 and the light bundle's optical path mechanism 30 or a portion of optical path mechanism 30. GPU 50 assigns specific processing elements to specific portions of optical path mechanism 30, such as by using threading support. The use of threading support allows for GPU 50 resources to be assigned when GPU 50 resources are ready or as the resources become available. Alternatively, if available, specific GPU 50 resources are assigned a strict ordering of specific processing elements to specific portions of optical path mechanism 30. The processing element of GPU 50 can throttle or toggle individual light bundles in the light field 400 based on feedback received by the processing element. In an example, the local modulating of light to handle high dynamic range (HDR) and local dynamic range variation makes the downstream management of tone mapping easier and results in less noise, such as in the local tone mapping (LTM) process. The local modulating of light is illustrated by the example in FIG. 5.

Figure 6:
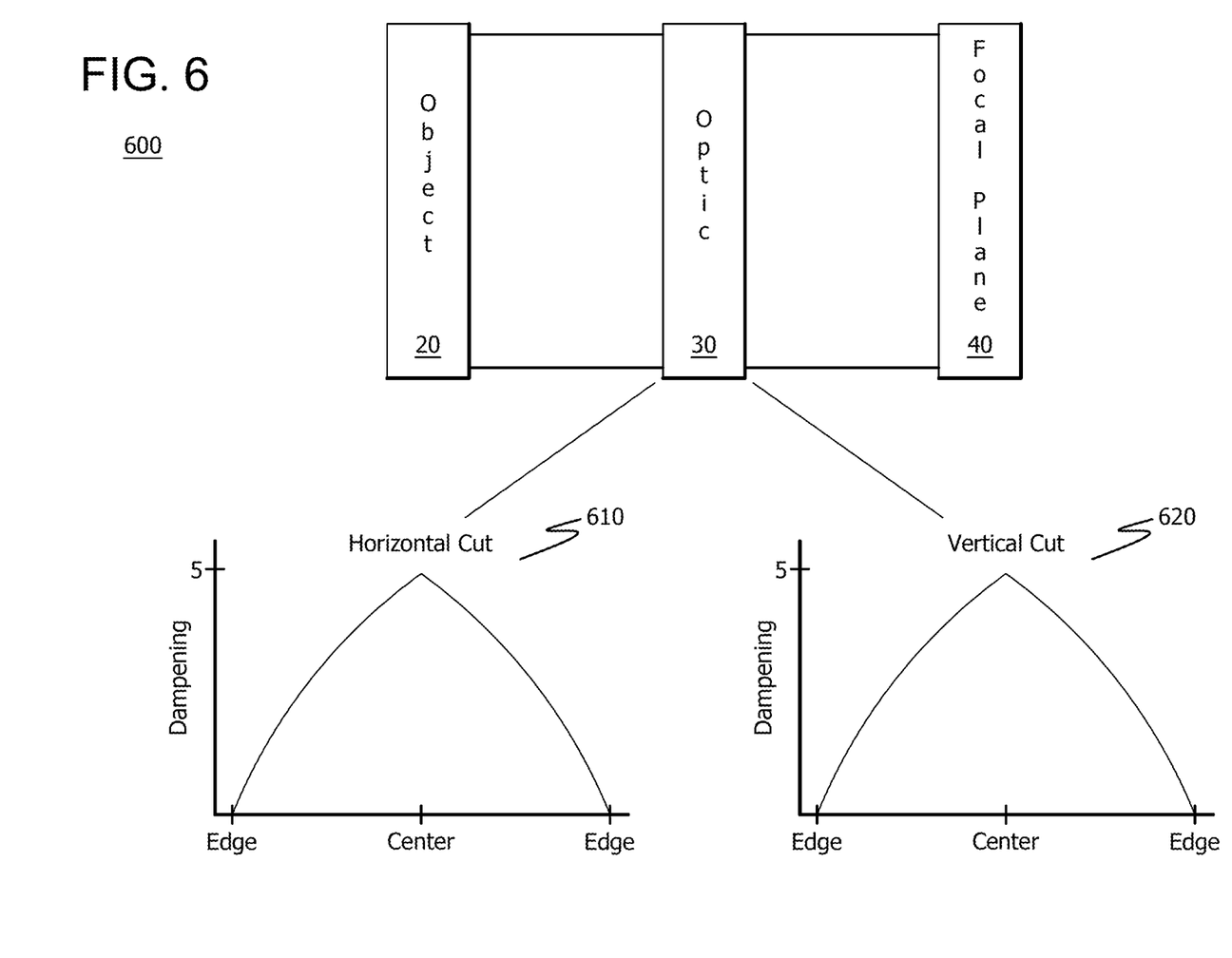
FIG. 6 illustrates an example system representing an optic that provides noise management control under conditions where the gain of the optics is not constant across the field of view.

Another aspect of this level of integration is noise management. In particular, dark current, vignetting (lens shading), chromatic aberration, and other noise sources. Some of this noise management can be mitigated or eliminated by using the processing element and temporal modulation at the optics level, such as manipulating focal length and aperture of other characteristics. One example of temporal modulation is multiple depth of field (DOF) capture. In this example, the light bundles are modulated to achieve a multi-aperture capture, resulting in the ability to select DOF locally. This multi-aperture capture reduces the need for downstream sharpening. The concept of multi-aperture capturing is illustrated in the example of FIG. 6.

By way of example only, optical path mechanism 30 is devised to provide on/off element transition. That is, the processing elements of GPU 50 control optical path mechanism 30 in an on/off grid, allowing certain light bundles of light field 400 to pass or not within system 10. This is the equivalent of having a shutter mechanism for each bundle. This shutter mechanism creates a unique pixel exposure by adding a switch and an analog-to-digital converter (ADC) to every pixel. This approach is less fine grain but more efficient. In normal image acquisition, the idea of individual shutter control over every pixel is unnecessary, instead doing it by areas of pixels is likely sufficient for image collection.

Figure 7:
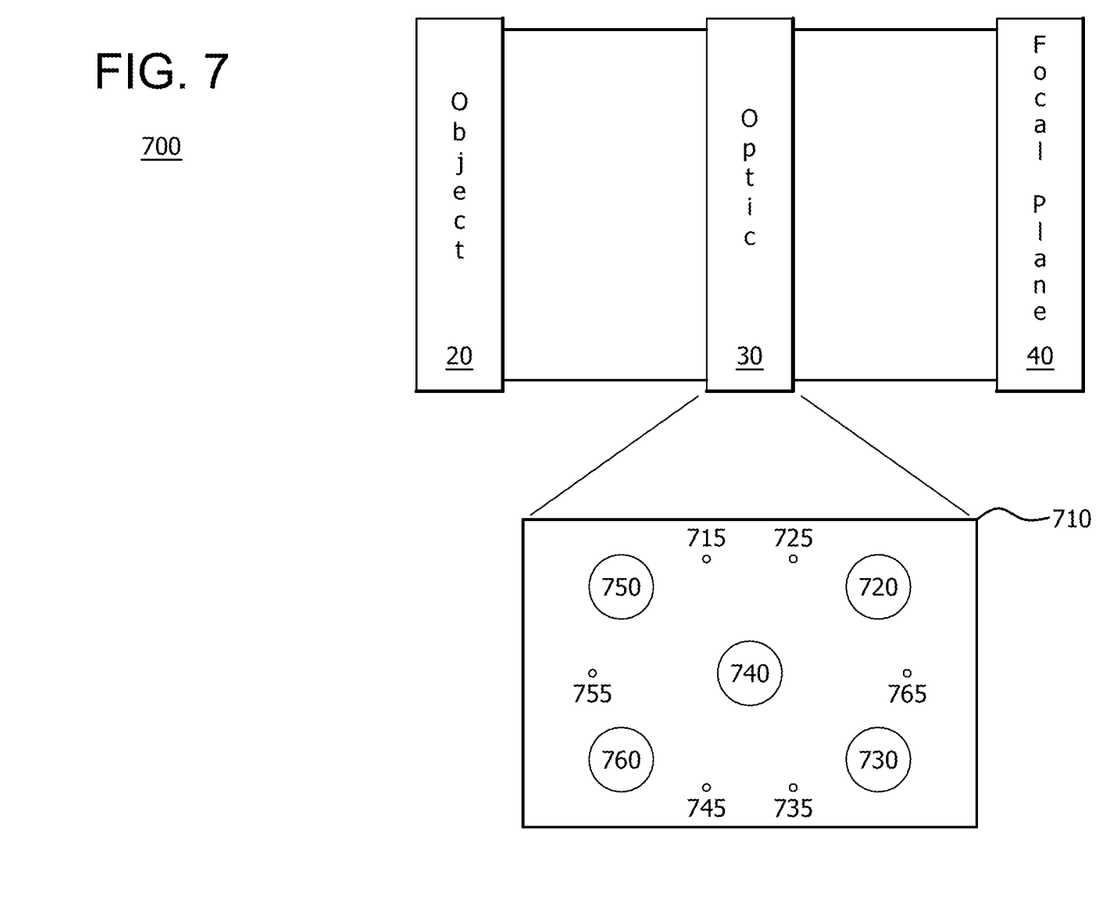
FIG. 7 illustrates an example system representing an optic that provides aperture control.

In an additional or alternative example, optical path mechanism 30 is devised to provide aperture control. That is, the processing elements of GPU 50 control the aperture of the light system by controlling the optical path mechanism 30, allowing certain light bundles of light field 400 to pass or not within system 10. Aperture control is useful for dynamic range, DOF and exposure/motion tradeoff. The concept of aperture control is illustrated in the example of FIG. 7.

Figure 8:
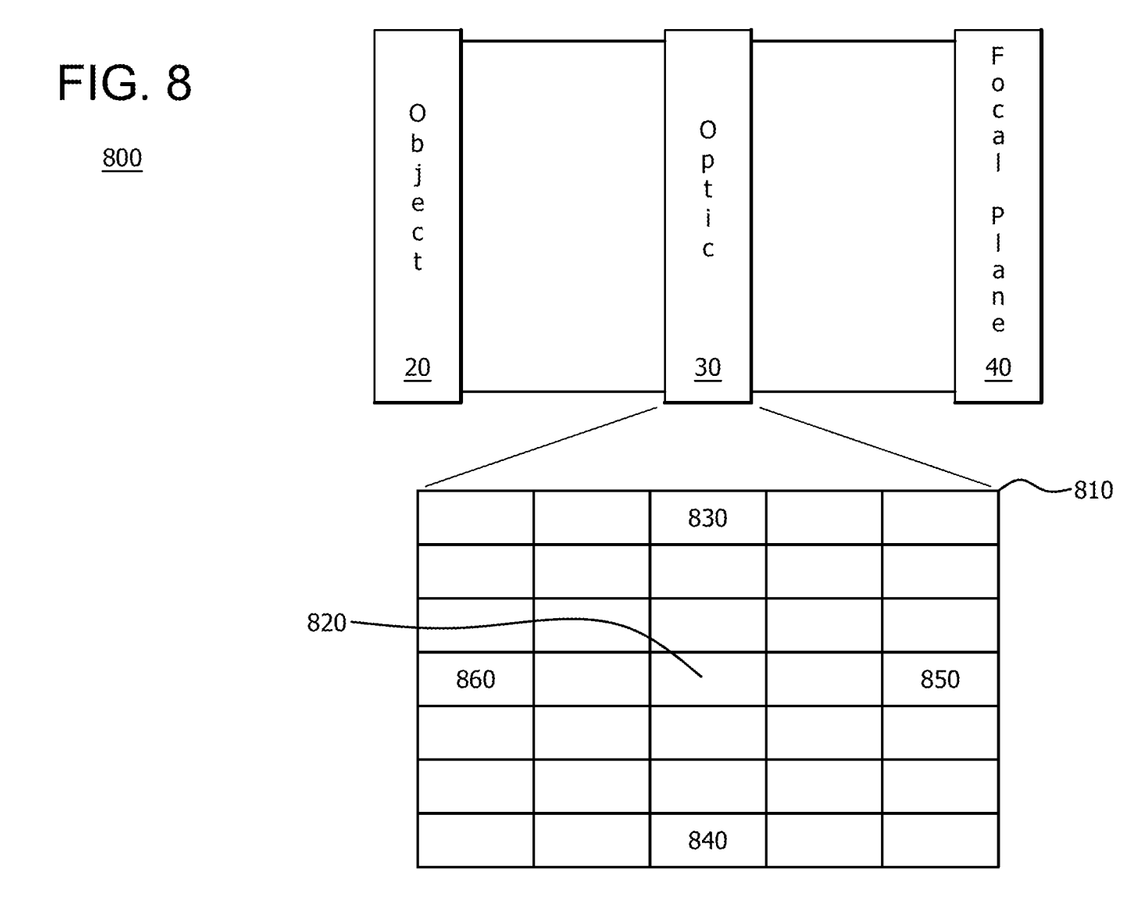
FIG. 8 illustrates an example system representing an optic that provides aperture control.

In an additional or alternative example, optical path mechanism 30 is devised to provide focal length control. That is, the processing elements of GPU 50 control the focal length of the light system by controlling the optical path mechanism 30, allowing certain light bundles of light field 400 to pass or not within system 10. An example of focal length control is computer vision. There are regions of interest (ROI), it makes sense to artificially "crop" the image and eliminate unnecessary regions from capture. This saves storage, bandwidth, and unnecessary computation to process an entire image. Based on the example discussed herein, these unnecessary regions of capture can just have those light bundles shut off. The concept of focal length control is illustrated in the example of FIG. 8.

Figure 5:
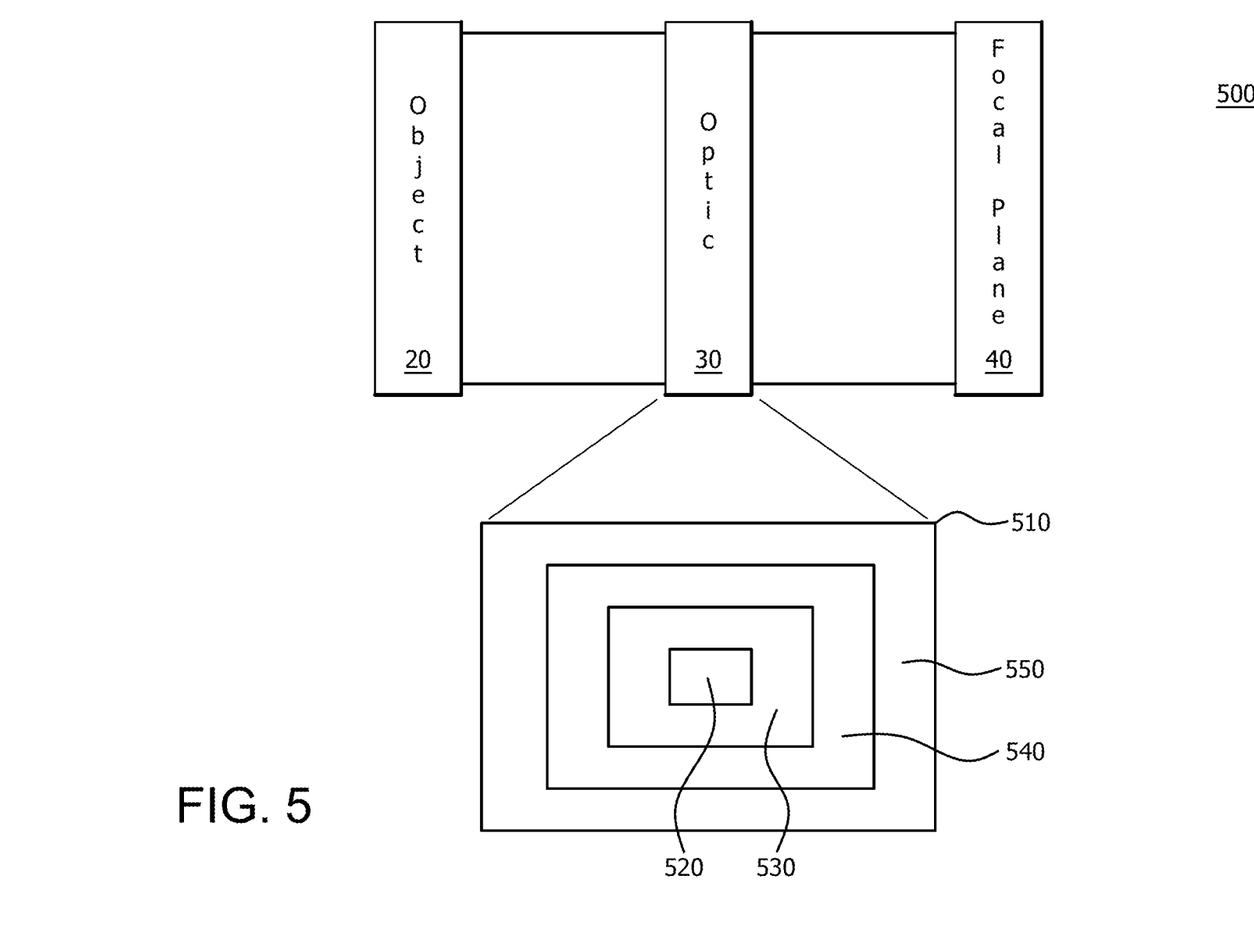
FIG. 5 illustrates an example system representing an optic that provides local modulating of light to handle high dynamic range (HDR) to enable downstream management of tone mapping.

FIG. 5 illustrates an example system 500 representing an optic 510 that provides local modulating of light to handle HDR to enable downstream management of tone mapping. System 500 includes object 20, optic 30, and focal plane 40 as described above with respect to at least FIG. 1. Optic 510 is an example optic of optic 30. GPU 50 from FIG. 1 is not shown in system 500, although GPU 50 controls optic 30, its configuration and provides feedback from focal plane 40 to achieve the desired effect provided by optic 30.

Generally, in performing HDR and local tone mapping in system 500 where the sensor at focal plane 40 is responsible for capturing the image data, HDR information is extracted downstream to control the contrast locally which is called Local tone mapping (LTM). Normally this control is performed at the central level, so the sensor has to capture an image that is in most cases well beyond its natural or intrinsic capture capability. In the present configuration, the HDR and the local contrast are modulated at the light gathering part of system 500 which is normally optic 30. By using local modulation of light, sensor 40 is able to capture the HDR information within its intrinsic dynamic range capacity. Once the light is modulated using the light bundles, the light bundles may be assigned to the respective locations in sensor 40. Because the light is modulated at optic 30, sensor 40 now views the object 20 in more or less the identical dynamic range as if it was seeing a non-HDR image.

By way of non-limiting example, optic 510 is divided into four concentric rectangular regions—an inner region 520, an outer region 550, a second outer region 540 and a second inner region 530. In an example, inner region 520 is designed to attenuate the light bundle by a factor of 10, second inner region is designed to attenuate the light bundle by a factor of 5, second outer region 540 is designed to attenuate by a factor of 2, and outer region 550 is designed to provide zero attenuation. Other attenuation values and/or may be utilized. Other configurations for attenuation may also be utilized. Additional or fewer regions may also be utilized.

The resulting information at the sensor 40 is then processed with knowledge of the local modulations of light imparted at optic 30. In other words, at some location in the sensor, there is an assignment of a modulation gain of the optic 510 and that gain makes the HDR function. The values in the image at selected pixels are then processed to account for the imparted attenuation, while importantly properly exposing all portions of the sensor 40.

In another illustrative example, the amount of light on a pixel is controlled by controlling optic 510, such as being configured to transmit 50% of the light bundle. The sensor captures the light with the processing accounting for the knowledge that only 50% of the light was transmitted. The regular facilities of the detector are used to capture the light using, for example, say 80% of the pixel well, but system 500 knows that a multiplication of the amount of light collected times the amount transmitted needs be imparted, for example.

This example demonstrates the use of local areas of contrast in high dynamic range scenes, for example, if there are back lit scenes in the snow or other similar features, this technique provides a way to extract the contrast but not destroy the total dynamic range and total contrast of the scene. By using this optical path throttling, both the high dynamic range capture and the local contrast management are controlled.

Further, system 500 in this example can be used to decrease a single pixel by a factor of two and then throttle a different pixel by a factor of three. Knowing these throttle factors allows adjustment by the processor of the value of each pixel, and also for extrapolation to other pixels within the image and around the identified pixels. Local tone mapping may be performed because the information is captured instead of saturating out that pixel or having so little information causing increased noise or doing other techniques where the local tone mapping is lost. In essence, this represents feathering.

FIG. 6 illustrates an example system 600 representing an optic 610 that provides noise management control under conditions where the gain of the optics is not constant across the field of view. System 600 is configured as described above with respect to at least FIG. 1 and includes object 20, optic 30, and focal plane 40. GPU 50 from FIG. 1 is not shown in system 600, although GPU 50 controls optic 30, its configuration and provides feedback from focal plane 40 to achieve the desired effect provided by optic 30.

Optic 610 is configured to account for the noise that exists in the center of the image. For example, there is one value if noise exists and the pixel at the edge of the image was reduced in value by virtue of vignetting, for example. This pixel at the edge has a different noise value and trying to adjust and manage the noise across the field is quite difficult when the vignetting effect is present. Maintaining a consistent noise management across the field of view under such conditions is difficult.

In a similar way, lateral chromatic aberration presents with similar issues. The noise of chromatic aberration correction becomes more acute when progressing from the center, the axial center, of the image to the edge of the image, and so the modulation technique illustrated in FIG. 6 essentially makes the lens appear very flat and minimizes the vignetting and axial lateral chromatic aberration.

As illustrated in FIG. 6, optic 30 is controlled by GPU 50 to dampen the light bundle in the center. By way of example, the curve 610 depicts the dampening curve as shown in a horizontal cut through optic 30. Curve 620 depicts the dampening curve as shown in a vertical cut through optic 30. These two curves (horizontal 610, vertical 620) are shown as being identical, although any variation between the curves could be utilized. Similarly, while each curve is symmetric about the center of the optic 30, other non-symmetrical configurations can be utilized.

In this depiction, the dampening factor applied at the center of optic 30 is 5, while the dampening factor is applied as a parabolic curve that decreases from the center to the edge. The edge includes no dampening.

FIG. 7 illustrates an example system 700 representing an optic 710 that provides aperture control. System 700 is configured as described above with respect to at least FIG. 1 and includes object 20, optic 30, and focal plane 40. GPU 50 from FIG. 1 is not shown in system 700, although GPU 50 controls optic 30, its configuration and provides feedback from focal plane 40 to achieve the desired effect provided by optic 30.

The aperture control creates a shutter mechanism for a pixel or groups of pixels in the focal plane 40. Optic 710 is an example of optic 30. This is achieved using the optic by working on a single area of optic 30 or by grouping portions of optic into larger segments of optic 30. As is shown in the exploded view 710 of optic 30, grouping may occur to create larger areas of the optic that are grouped together, such as groups 720, 730, 740, 750, 760. Other portions may be specifically controlled such as single areas 715, 725, 735, 745, 755, 765. These groupings 720, 730, 740, 750, 760 and areas 715, 725, 735, 745, 755, 765 provide the ability to control a shutter mechanism for each bundle. The shutter mechanism creates a unique pixel exposure by effectively adding a switch and an analog-digital converter (ADC) to every pixel.

This provides individually timed exposures for each area 715, 725, 735, 745, 755, 765 or group 720, 730, 740, 750, 760, by using this kind of switch and ADC type of arrangement, by providing a shutter mechanism for a local area within the field of view. While not actually using a switch and ADC, the shutter control in areas 715, 725, 735, 745, 755, 765 and groups 720, 730, 740, 750, 760 operates to control exposure to portions of or light bundles. The areas 715, 725, 735, 745, 755, 765 or groups 720, 730, 740, 750, 760 can be small or large and any size as needed. Each area 715, 725, 735, 745, 755, 765 is generally isolated and assigned the same shutter and timing for that group 720, 730, 740, 750, 760 allowing selectivity for controlling small light bundles in small areas of the image.

These timed exposures may also be useful to remove motion from images or frames. There are two types of motion—interframe motion, which is motion between frames of a video, and intraframe motion, which is motion inside one frame of capture. Aperture control is one of the tools to control intraframe motion. Aperture control is used to control interframe motion because this type of motion is temporal in nature.

In the spatial type of intraframe captures, aperture control is the main mechanism that is used to either allow or not allow the motion. There are occasions where there is a desire to have an effect of a blurry element in motion, but often times this desire does not exist. There may instead be a desire to make the picture look sharp even if there is a little bit of motion involved.

The depth of field may be defined by virtue of aperture control and provide global control of the aperture, and thereby stop down the optics. The aperture may be controlled within the bundle. This provides a dual mechanism to control depth of field. That is, depth of field can be controlled globally by controlling the aperture, or individual areas or small areas within a light bundle can be controlled using individual depth of field control.

For example, if you have a very bright object that was moving against a very dark background, which is not moving, it may be desirable to have the dark background be exposed with as much aperture as possible. Normally, this would saturate the object because of its brightness. Using the light bundle to control the dynamic range, these issues are resolved and the exposures can be controlled. The depth of field and the exposure control provides the option of controlling individually or locally within the image, or within the frame.

An initial image or subimage may be taken and processed to provide feedback or information on the scene of an image. This feedback may be created by capturing an initial set of information from the initial image or subimage to get an idea of the scene. Once that initial information is known, then the power of the GPU is sufficient (current operations are in the neighborhood of 200 to 1000 operations per pixel) to be able to run through all the calculations and either use a number of different techniques, such as gamma filters, tracking filters or other techniques provided the spatial and temporal behavior is in this field of view. This is similar conceptually to using red-eye reduction or auto-exposure algorithms by taking an initial image and flash and then the desired image. Convergence algorithms are used to converge on the target and are generally well understood in the art, applied here with expanded control using increasingly narrower and finer grain regions of the image through these light bundle modulation types of schemes described herein. This in essence creates thousands of cameras inside the lens with the GPU controlling each one.

FIG. 8 illustrates an example system 800 representing an optic 810 that provides aperture control. System 800 is configured as described above with respect to at least FIG. 1 and includes object 20, optic 30, and focal plane 40. GPU 50 from FIG. 1 is not shown in system 800, although GPU 50 controls optic 30, its configuration and provides feedback from focal plane 40 to achieve the desired effect provided by optic 30.

In modifying optic 30, the focal length is modified. This changes the optics in terms of its magnification including spatial magnification. By way of example, if there is a telephoto lens, a portion of the lens, such as a group of lenses in the middle of the telephoto lens, is moved to affect the focal length of the lens. Importantly, the back focal length of the lens, the distance from the back of the lens to the focal plane, is maintained. This movement of the lens has the effect of changing the trajectory of each of the rays of light coming into the optics.

In the configuration of FIG. 8, there is a digital version of a telephoto lens without moving any lenses. By way of example, if optic 30 is a digital mirror 810. Digital mirror 810 provides the capacity to individually control the bundles of light and steer each. As discussed above, the aperture example modulated the amount of light passing through or being included in the bundle. In this case, though instead of modulating the light through the bundle, the bundle is modulated or steered. This projects the bundle onto the focal plane at another pixel, another location, and has the effect of magnifying or reducing the field of view by virtue of changing the effective focal plane. That is, there is a mechanism by which virtual zoom is achieved without changing or without altering the physical location of the optics.

In optic 810, there is a portion 820 approximately at the center. The angle of this portion 820 is modified to move the light bundle from the center of focal plane 40 to an edge, for example. This dynamic angling of the beam changes the focal length based on the triangle created by the back focal length and the amount the image is moved within the focal plane. The change in focal length is realized on the remaining leg of the formed triangle, while maintaining the distance from the last element in the optics to the sensor.

Similarly, the light bundles striking optic 810 at positions 830, 840, 850, 860 may be moved across the focal plane 40. For example, light bundle striking portion 830 may be moved to register in the focal plane 40 at the point where light bundle striking portion 840 in an unmodified state strikes the focal plane 40, and vice versa. Similarly, light bundle striking portion 850 may be moved to register in the focal plane 40 at the point where light bundle striking portion 860 in an unmodified state strikes the focal plane 40, and vice versa.

In an additional or alternative example, optical path mechanism 30 is utilized to provide chromatic control. That is, the processing elements of GPU 50 control the chromatic response of the light system by controlling the optical path mechanism 30, allowing certain light bundles of light field 400 to pass or not within system 10. Low light situations provide an example of the need for chromatic control. In low light, one of the most difficult tasks is to extract Chroma information. In order to provide picture this situation, envision video taken at night, which tends to have Chroma noise. Generally, it is easier to darken images that have sufficient Chroma sampling (DR). The portions of the optic 20 may be utilized as in FIG. 5, for example. These portions may be used to expose each portion to appropriate levels of the well of each pixel. It should be understood that many variations of connection are possible based on the disclosure herein. Although features and elements are described above in particular combinations, each feature or element can be used alone without the other features and elements or in various combinations with or without other features and elements.

Figure 9:
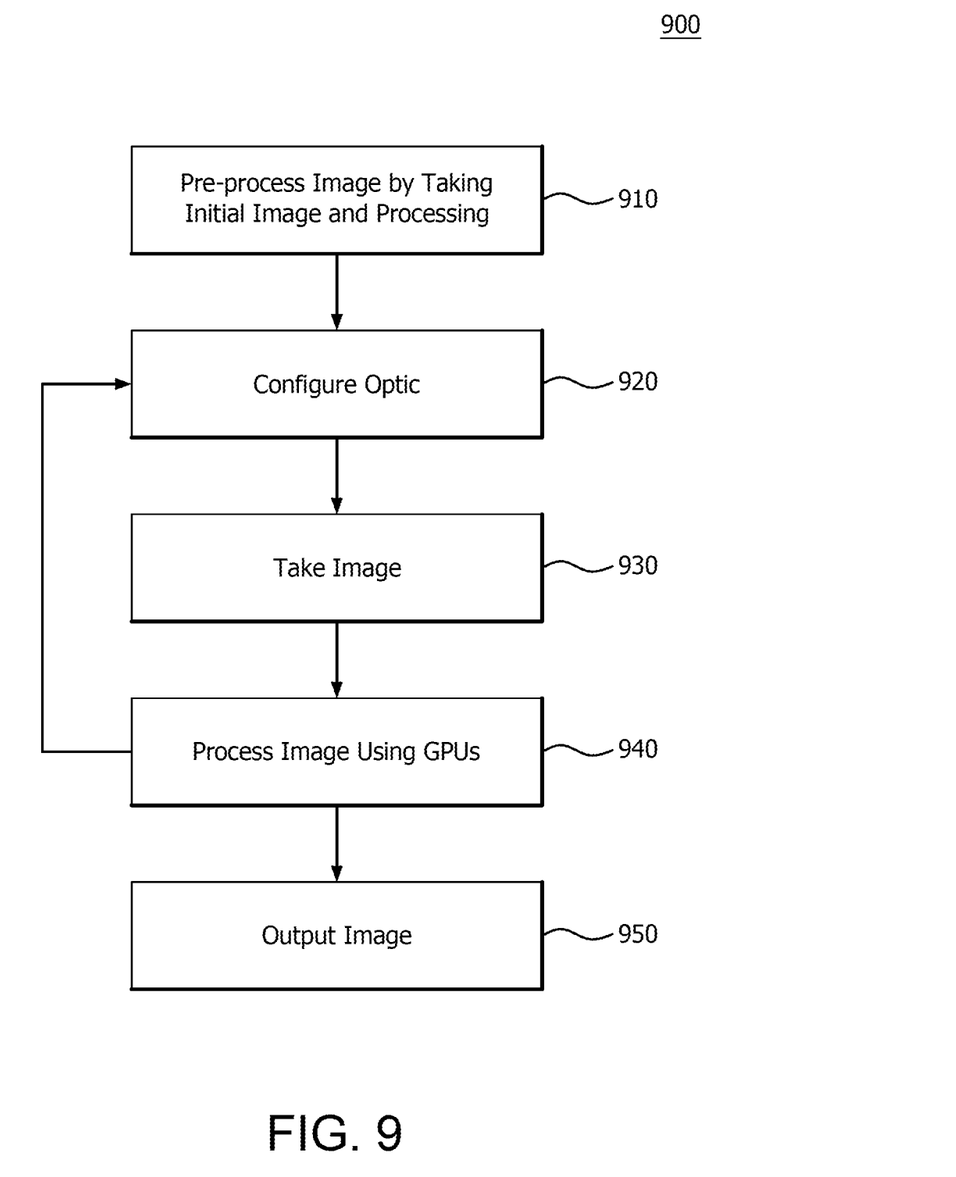
FIG. 9 illustrates a method performed within the system of FIG. 1 for controlling characteristics of collected image data.

FIG. 9 illustrates a method 900 performed within the system of FIG. 1 for controlling characteristics of collected image data. Method 900 includes preforming pre-processing at step 910 by taking at least one initial image and processing the image using the GPUs. This initial image may be a sub-image or partial image allowing less data reduction. At step 920, the optic is configured according to the processing of step 910. The configuring of the optic can conform to any number of techniques of manipulating the light bundles, as described herein above, and can be designed to provide benefit to improve aberrations, signal-to-noise, and dynamic range, by non-limiting example only. At step 930, the desired image may be taken. Once taken, the image is processed using the GPUs, either by assigning a GPU to each light bundle or by using GPU processing techniques to assign available GPUs to the light bundle as necessary. Once processed, a loop to configure the optic at step 920 is formed. Such a loop provides the ability to provide additional configuration and can be used in case the pre-processing at step 910 did not produce adequate results. Once the processed image is reduced and the desired effects removed, the image is output at step 950.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for controlling characteristics of collected image data, the method comprising:
   performing pre-processing of an inital image using a Graphical Processing Unit (GPU);
   configuring an optic based on the pre-processing to provide a dampening factor to the optic to dampen at least a portion of a light bundle of the image to account for at least one feature of the pre-processed image;
   acquiring an image using the configured optic;
   processing the acquired image using the GPU;
   determining if the processed acquired image accounts for the at least one feature of the pre-processed image;
   outputting the acquired image when the determination is affirmative; and
   repeating the configuring of the optic and re-acquiring the image when the determination is negative.

2. The method of claim 1 wherein the pre-processing includes taking at least one image.

3. The method of claim 2 wherein the one image is a sub-image.

4. The method of claim 1 wherein the dampening factor is centered in the image.

5. The method of claim 1 wherein the dampening factor is non-symmetrical about at least one axis of the configured optic.

6. The method of claim 1 wherein the dampening factor is symmetrical about at least one axis of the configured optic.

7. The method of claim 1 wherein the dampening factor is identical in a horizontal axis of the configured optic and a vertical axis of the configured optic.

8. The method of claim 1 wherein the dampening factor is non-identical in a horizontal axis of the configured optic and a vertical axis of the configured optic.

9. The method of claim 1 wherein the light bundle corresponds to an area in a focal plane.

10. The method of claim 1 wherein the dampening factor is zero at at least one portion of the image.

11. The method of claim 1 wherein the dampening factor is largest at a center of the image.

12. The method of claim 11 wherein the dampening factor is smallest at an edge of the image.

13. The method of claim 1 wherein the feature is a bright object in a field of view.

14. The method of claim 1 wherein the feature is low light levels in the image.

15. A device for controlling characteristics of collected image data, the device comprising:
    a plurality of graphic processing units (GPUs) coupled to an image collection device for performing pre-processing of an initial image;
    the plurality of GPUs configuring an optic based on the pre-processing to provide a dampening factor to the optic to dampen at least a portion of a light bundle of the image to account for at least one feature of the pre-processed image;
    acquiring an image using the configured optic via the image collection device;
    the plurality of GPUs processing the acquired image to determine if the processed acquired image accounts for the at least one feature of the pre-processed image, outputting the acquired image when the determination is affirmative, and repeating the configuring of the optic and re-acquiring the image when the determination is negative.

16. The device of claim 15 wherein the dampening factor is centered in the image.

17. The device of claim 15 wherein the dampening factor is identical in a horizontal axis of the configured optic and a vertical axis of the configured optic.

18. The device of claim 15 wherein the dampening factor is largest at a center of the image.

19. The device of claim 18 wherein the dampening factor is smallest at an edge of the image.

20. A non-transitory computer-readable medium comprising a computer program product recorded thereon and capable of being run by a processor, including program code instructions for controlling characteristics of collected image data by implementing steps comprising:
    performing pre-processing of an initial image using Graphical Processing Units (GPUs);
    configuring an optic based on the pre-processing to provide a dampening factor to the optic to dampen at least a portion of a light bundle of the image to account for at least one feature of the pre-processed image;
    acquiring an image using the configured optic;
    processing the acquired image using the GPU;
    determining if the processed acquired image accounts for the at least one feature of the pre-processed image;
    outputting the acquired image when the determination is affirmative; and
    repeating the configuring of the optic and re-acquiring the image when the determination is negative.

* * * * *